US012427793B2

(12) United States Patent
Ohtani

(10) Patent No.: US 12,427,793 B2
(45) Date of Patent: Sep. 30, 2025

(54) IMAGE FORMING APPARATUS AND IMAGE FORMING METHOD

(71) Applicant: Masaharu Ohtani, Kanagawa (JP)

(72) Inventor: Masaharu Ohtani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 18/359,014

(22) Filed: Jul. 26, 2023

(65) Prior Publication Data

US 2024/0075756 A1 Mar. 7, 2024

(30) Foreign Application Priority Data

Sep. 1, 2022 (JP) ................................ 2022-139248

(51) Int. Cl.
*B41J 3/407* (2006.01)
*B41J 11/00* (2006.01)
*B41J 25/308* (2006.01)

(52) U.S. Cl.
CPC .......... *B41J 11/007* (2013.01); *B41J 11/0095* (2013.01); *B41J 25/308* (2013.01)

(58) Field of Classification Search
CPC .. B41J 3/4073; B41J 2203/00; B41J 2203/01; B41J 2203/011; B41J 11/0095
See application file for complete search history.

(56) References Cited

U.S. PATENT DOCUMENTS

2005/0151773 A1 7/2005 Watarai
2009/0303276 A1 12/2009 Van de Wynckel et al.
2011/0057971 A1 3/2011 Yokoyama et al.
2020/0101769 A1 4/2020 Kunioka et al.
2021/0229472 A1 * 7/2021 Morino ................. B41J 3/4078
2023/0130748 A1 4/2023 Ohtani

FOREIGN PATENT DOCUMENTS

JP 2011-126131 A 6/2011
JP 2019-073826 A 5/2019
JP 2019-136999 A 8/2019
JP 2019-177606 A 10/2019
JP 2019171642 A * 10/2019
JP 2021-115847 A 8/2021
JP 2023031451 A * 3/2023

OTHER PUBLICATIONS

Yoshitani, MachineTranslationofJP-2019171642-A, 2019 (Year: 2019).*
Aida, Machine TranslationofJP-2023031451-A (Year: 2023).*
Extended European Search Report dated Jan. 16, 2024 for corresponding European Application No. 23192556.1.

* cited by examiner

*Primary Examiner* — Scott A Richmond
(74) *Attorney, Agent, or Firm* — Harness, Dickey & Pierce, P.L.C.

(57) ABSTRACT

An image forming apparatus includes an image forming device, a base, circuitry, and a detector. The image forming device includes a recording head to form an image on a recording medium conveyed in a conveyance direction. The base supports the recording medium and is movable in the conveyance direction. A type of the base is changeable according to a type of the recording medium. The circuitry sets a detection range in the conveyance direction. The detector detects, before the image is formed, a collision between the recording head and the recording medium on the base, in the detection range set by the circuitry.

7 Claims, 19 Drawing Sheets

IMAGE FORMING APPARATUS AND IMAGE FORMING METHOD

CROSS-REFERENCE TO RELATED APPLICATION

This patent application is based on and claims priority pursuant to 35 U.S.C. § 119(a) to Japanese Patent Application No. 2022-139248, filed on Sep. 1, 2022, in the Japan Patent Office, the entire disclosure of which is hereby incorporated by reference herein.

BACKGROUND

Technical Field

Embodiments of the present disclosure relate to an image forming apparatus and an image forming method.

Related Art

So-called garment printing technology is known in the art for image forming apparatuses that form images on, for example, fabric products or clothing as recording media. Garment printing needs adjustment of the height of a base after placing a recording medium on the base. As known in the art, some techniques have been proposed that detect the height of the base with a sensor to adjust the height of the base to an optimum height.

SUMMARY

According to an embodiment of the present disclosure, an image forming apparatus includes an image forming device, a base, circuitry, and a detector. The image forming device includes a recording head to form an image on a recording medium conveyed in a conveyance direction. The base supports the recording medium and is movable in the conveyance direction. A type of the base is changeable according to a type of the recording medium. The circuitry sets a detection range in the conveyance direction. The sensor detects, before the image is formed, a collision between the recording head and the recording medium on the base, in the detection range set by the circuitry.

According to an embodiment of the present disclosure, an image forming method includes setting a detection range in a conveyance direction, detecting a collision between a recording head and a recording medium on a base in the detection range, and forming, with the recording head, an image on the recording medium conveyed in the conveyance direction. The base supports the recording medium and is movable in the conveyance direction. A type of the base is changeable according to a type of the recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
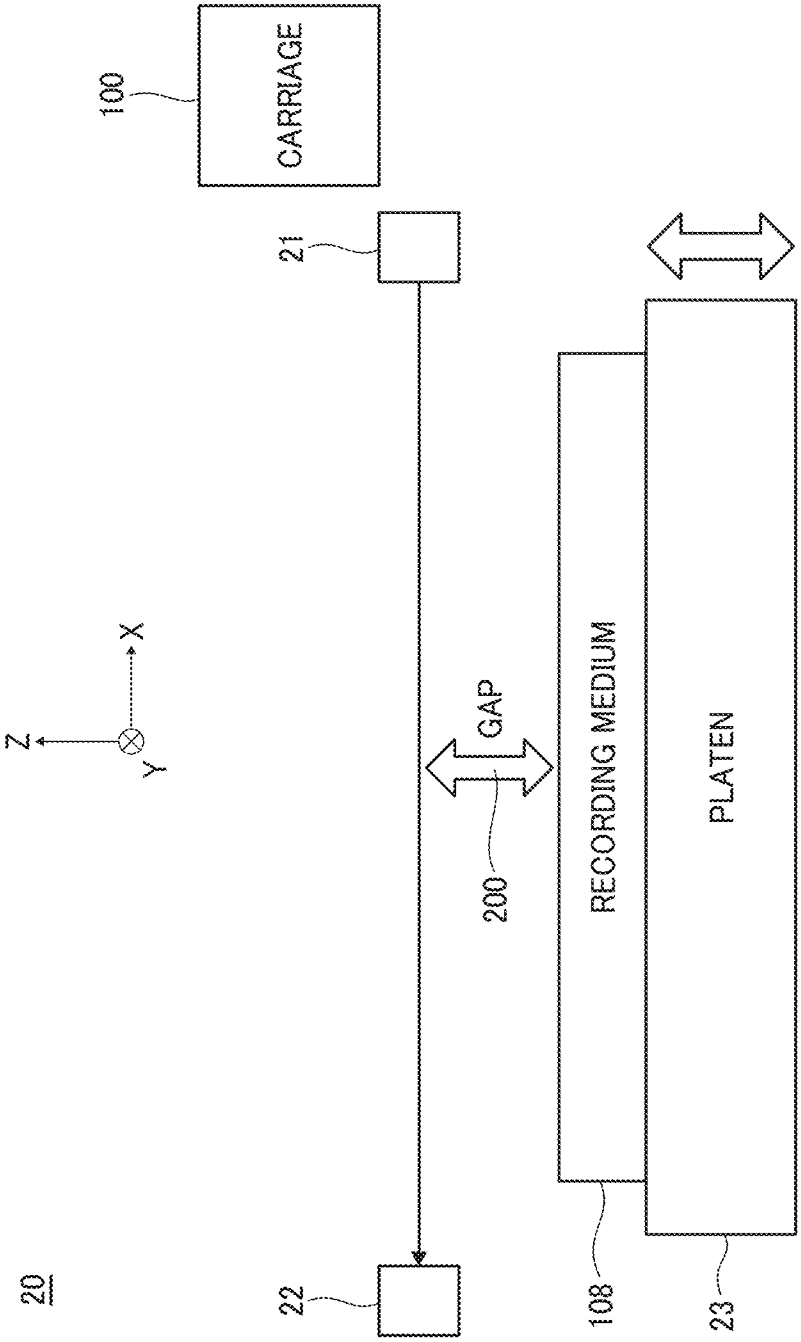
FIG. 1 is a front view of an image forming apparatus capable of detecting a collision, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

Initially, with reference to FIG. 1, a description is given of an overall configuration of an image forming apparatus according to an embodiment of the present disclosure.

FIG. 1 is a front view of an image forming apparatus 20 capable of detecting a collision, according to the present embodiment.

More specifically, FIG. 1 is a diagram illustrating a configuration of the image forming apparatus 20 as viewed in a direction perpendicular to a main scanning direction.

A recording medium 108 is conveyed in a "Y" axis direction or Y-axis direction. In other words, the Y-axis direction is a "conveyance direction" of the recording medium 108. A direction perpendicular to the recording medium 108 is referred to as a "Z" axis direction or Z-axis direction. The Z-axis direction is a so-called vertical direction, height direction, or gravity direction. An "X" axis direction or X-axis direction is a direction orthogonal to the Y-axis direction.

The image forming apparatus 20 detects a collision with a light emitting diode (LED) 21 and a light receiving device 22.

The LED 21 and the light receiving device 22 are disposed at the same position on the Z-axis.

A carriage 100 includes a recording head.

The recording medium 108 is conveyed together with a platen 23.

The position of the platen 23 in the Z-axis direction can be adjusted. When the platen 23 moves in the Z-axis direction, the recording medium 108 on the platen 23 also moves in the Z-axis direction. The platen 23 fixes the recording medium 108 and moves in the conveyance direction with the recording medium 108.

When the recording medium 108 moves in the Z-axis direction and blocks the light emitted by the LED 21, the light receiving device 22 no longer receives the light emitted by the LED 21. When the light receiving device 22 no longer receives the light, the position of the platen 23 in the Z-axis direction is adjusted.

A gap 200 is a distance between the recording medium 108 and the recording head. The gap 200 is a difference in height in the Z-axis direction between the recording medium 108 and the recording head of the carriage 100.

Figure 2:
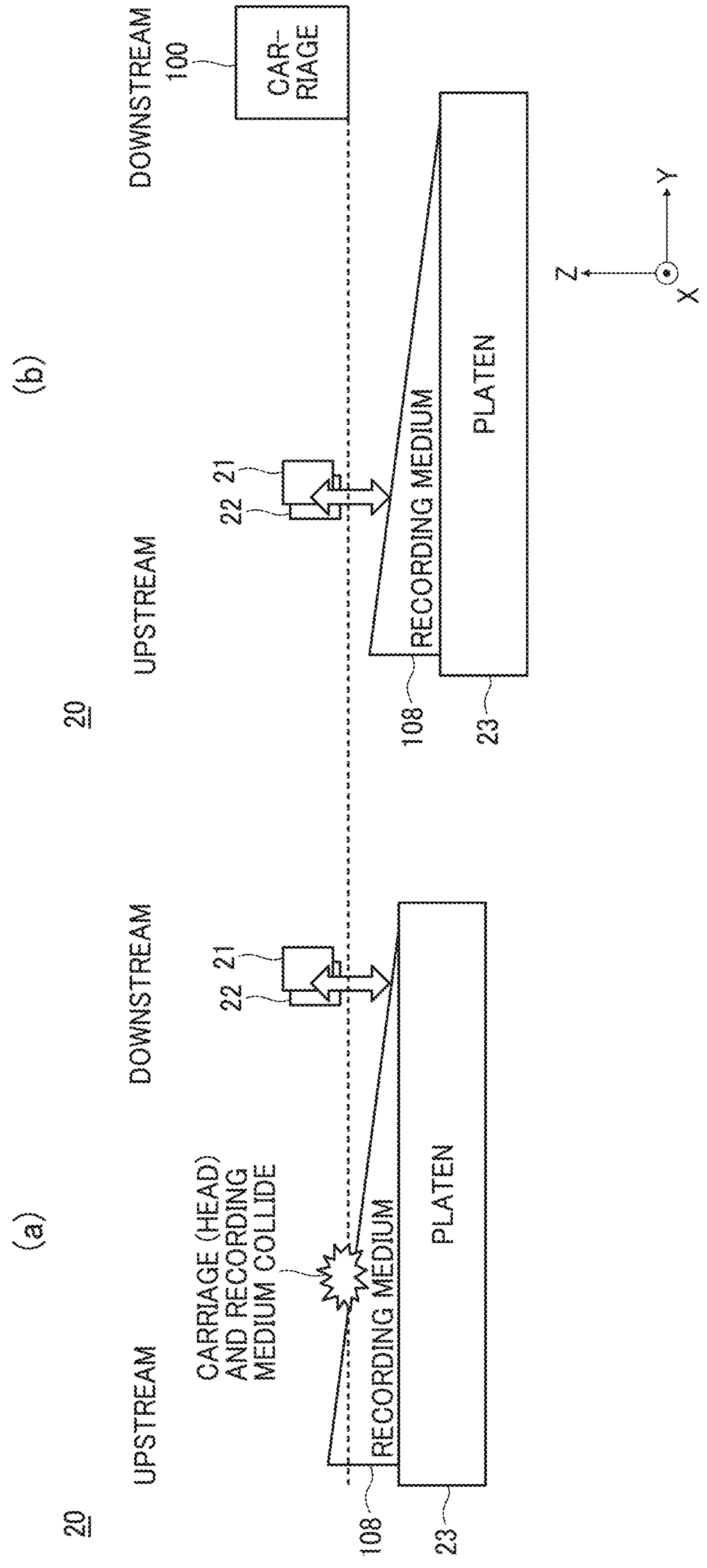
FIG. 2 is a side view of the image forming apparatus of FIG. 1.

FIG. 2 is a side view of the image forming apparatus 20 capable of detecting a collision, according to the present embodiment.

As illustrated in FIG. 2, in this example, the recording medium 108 has a shape, which gradually decreases in height, from upstream to downstream in the conveyance direction.

When the platen 23 is adjusted to a relatively low position as illustrated in FIG. 2(*b*), such that the height of the recording medium 108 is below a reference position corresponding to the position where the LED 21 and the light receiving device 22 are disposed (dotted line in FIG. 2), the recording head and the recording medium 108 do not collide with each other. In other words, the collision can be prevented when the position of the platen 23 is adjusted based on a result of detection of a portion of the recording medium 108 having a height greater than the reference point.

By contrast, the recording head and the recording medium 108 may collide with each other when the position of the platen 23 is adjusted based on a result of detection of a portion of the recording medium 108 having a height equal to or less than the reference point as illustrated in FIG. 2(*a*).

For this reason, before forming images, the image forming apparatus 20 determines whether a collision occurs between the recording medium 108 and the recording head.

Figure 3A:
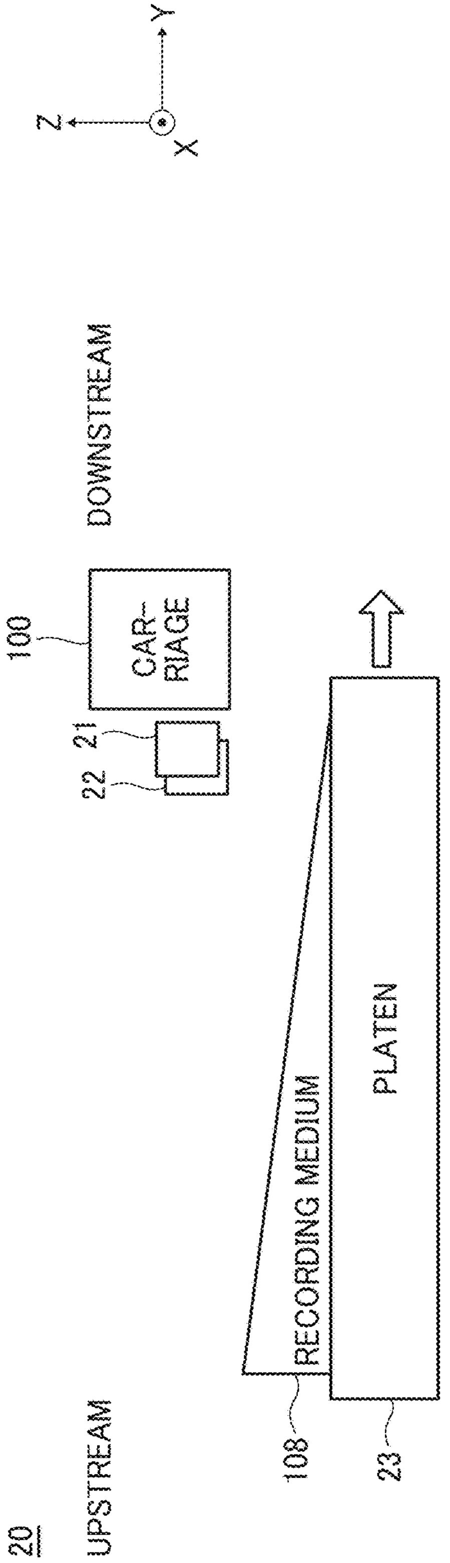
FIGS. 3A and 3B are diagrams illustrating an example of detection performed before image formation is performed, according to an embodiment of the present disclosure.
Figure 3B:
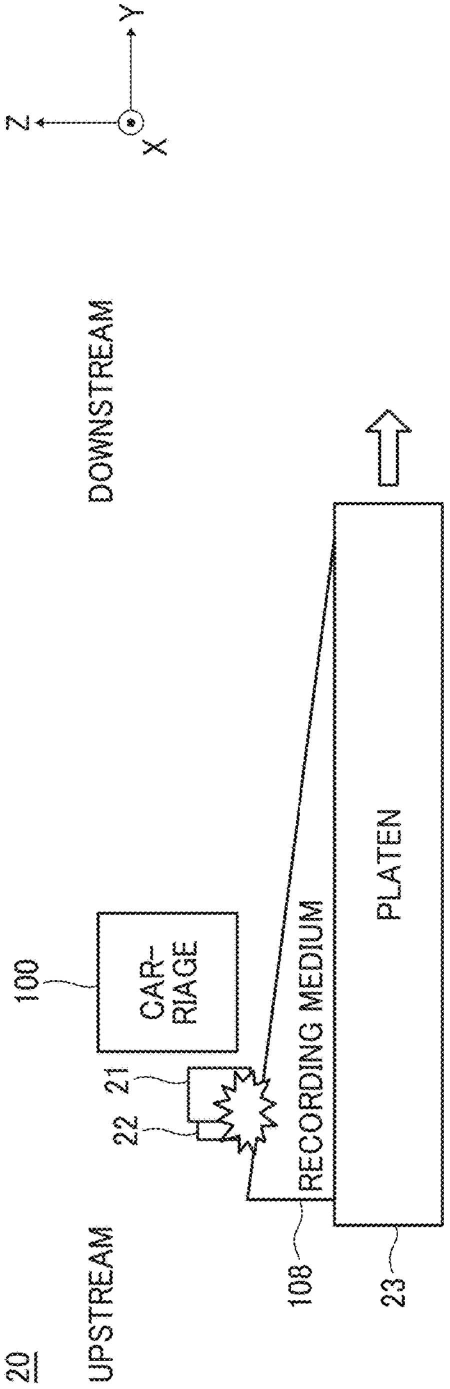

FIGS. 3A and 3B are diagrams illustrating an example of detection that is performed before image formation is performed, according to the present embodiment.

A description is given below of a transition from the state illustrated in FIG. 3A to the state illustrated in FIG. 3B, according to the present embodiment.

In contrast to the state illustrated in FIG. 3A, FIG. 3B illustrates the platen 23 moved downstream from the platen 23 illustrated in FIG. 3A in the conveyance direction. The movement causes the recording medium 108 to block the light emitted by the LED 21. In other words, the recording head is at a position on the Z-axis where the recording head collides with the recording medium 108. Such movement of the recording medium 108 in the conveyance direction allows detection, before image formation, as to whether the recording medium 108 and the recording head collide with each other.

The above-described detection may be performed before image formation or may be performed in conjunction with other operations. When the collision between the recording medium 108 and the recording head is detected, the image forming apparatus 20 stops the subsequent operation. The image forming apparatus 20 thus prevents a collision between the recording medium 108 and the recording head.

Figure 4:
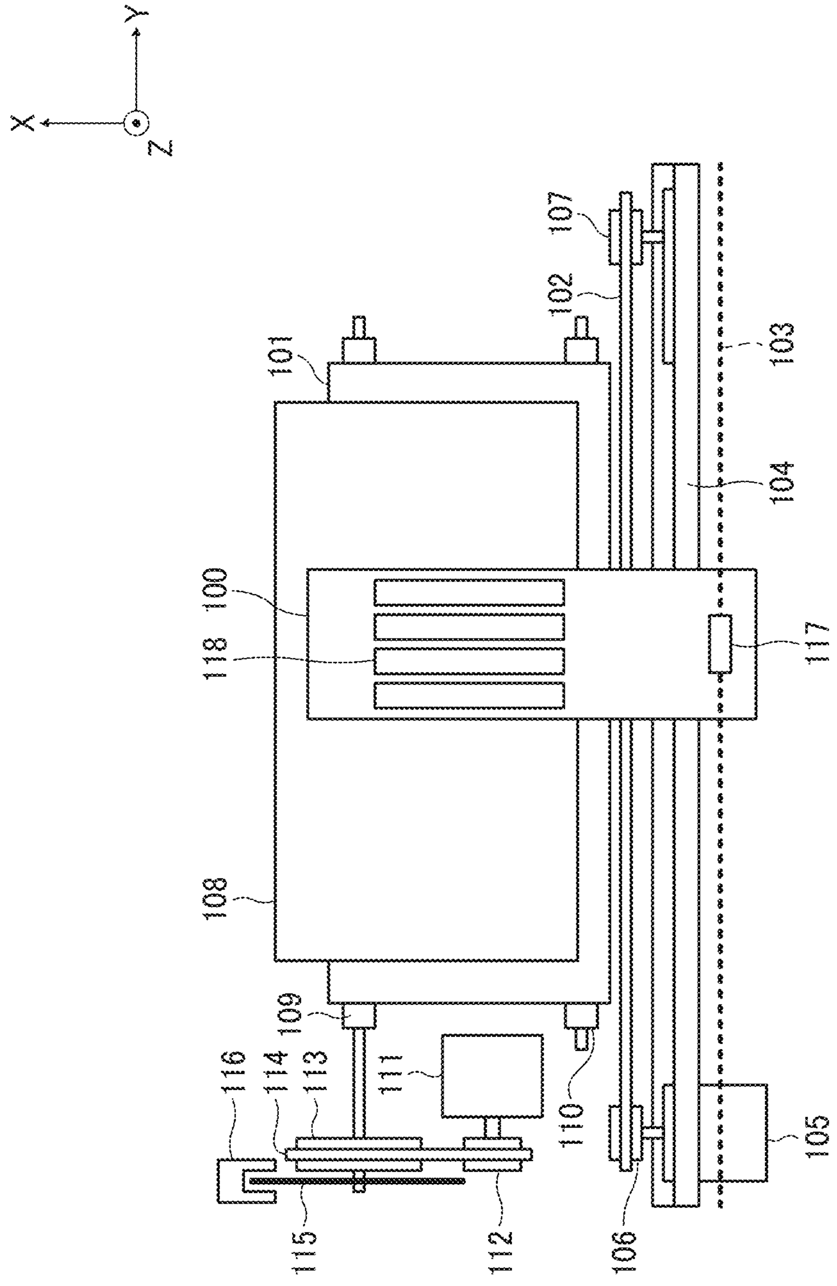
FIG. 4 is a top view of the image forming apparatus of FIG. 1.

FIG. 4 is a top view of the image forming apparatus 20 capable of detecting a collision, according to the present embodiment.

The image forming apparatus 20 includes a conveyor belt 101, a timing belt 102, a slide rail 104, a main-scanning motor 105, a driving pulley 106, a driven pulley 107, a conveyance roller 109, a sub-scanning motor 111, a conveyance driving pulley 112, a timing belt 114, an encoder wheel 115, an encoder sensor 116, an encoder sensor 117, and a recording head 118.

The slide rail 104 is integrated with a metal plate. The slide rail 104 holds the carriage 100. The carriage 100 moves on the slide rail 104.

The timing belt 102 is entrained around the driving pulley 106 and the driven pulley 107. The timing belt 102 is coupled to the carriage 100. Accordingly, when the main-scanning motor 105 rotates and drives the driving pulley 106, the rotation of the timing belt 102 moves the carriage 100 in the X-axis direction (main scanning direction).

The carriage 100 includes a recording head 118 that discharges ink droplets for each color of, for example, yellow (Y), cyan (C), magenta (M), and black (K). The number of colors or the order in which the colors are arranged may be other than the aforementioned number or order.

The recording head 118 is in a posture in which a nozzle face faces the recording medium 108. The nozzle face is a face of a nozzle plate on which a plurality of ink discharge ports (nozzles) are formed. The nozzle face includes nozzle rows in the Y-axis direction (sub-scanning direction).

The recording head 118 discharges ink with, for example, a piezoelectric actuator such as a piezoelectric element, a thermal actuator that employs a thermoelectric conversion element, such as a heating resistor, to use phase changes due to liquid film boiling, a shape-memory alloy actuator that uses metal phase changes due to temperature changes, or an electrostatic actuator that uses electrostatic force.

An encoder scale 103 passes through the carriage 100. The encoder scale 103 has slits. On the other hand, the carriage 100 detects a position on the X-axis with the encoder sensor 117 included in the carriage 100.

The image forming apparatus 20 conveys the platen 23 with the conveyor belt 101. Since the recording medium 108 is placed on the platen 23, the movement of the platen 23 moves the recording medium 108 together with the platen 23.

The image forming apparatus 20 rotates the sub-scanning motor 111 to drive the conveyance roller 109. When the conveyance roller 109 is driven, the conveyor belt 101 moves in the Y-axis direction (sub-scanning direction).

The conveyance driving pulley 112 is coupled to the sub-scanning motor 111. On the other hand, a conveyance roller pulley 113 is coupled to the conveyance roller 109. The timing belt 114 is entrained around the conveyance driving pulley 112 and the conveyance roller pulley 113. Accordingly, when the sub-scanning motor 111 is rotated, the conveyance driving pulley 112, the conveyance roller pulley 113, and the timing belt 114 are rotated together in conjunction with the rotation of the sub-scanning motor 111. Since the conveyor belt 101 is wound around the conveyance roller 109, the rotation of the sub-scanning motor 111 also moves the conveyor belt 101 in the Y-axis direction (sub-scanning direction).

An encoder wheel 115 is coupled to a rotary shaft of the conveyance roller 109. The encoder wheel 115 has slits. The encoder sensor 116 detects the slits. The position of the conveyor belt 101 in the Y-axis direction (sub-scanning direction) is detected by the encoder wheel 115 and the encoder sensor 116.

The conveyor belt 101 is an endless belt. The conveyor belt 101 is entrained around the conveyance roller 109 and a tension roller 110. Accordingly, the conveyor belt 101 rotates in the Y-axis direction (sub-scanning direction). The conveyor belt 101 is charged by a charging roller during the rotation.

The conveyor belt 101 may have a single-layer structure or a multilayer structure including two or more layers. In a case where the conveyor belt 101 has a single-layer structure, the conveyor belt 101 has an entire layer made of an insulating material, which contacts the recording medium 108 and the charging roller. On the other hand, in a case where the conveyor belt 101 has a multi-layer structure, the conveyor belt 101 has an insulation layer that contacts the recording medium 108 and the charging roller and a conductive layer that does not contact the recording medium 108 or the charging roller.

Figure 5:
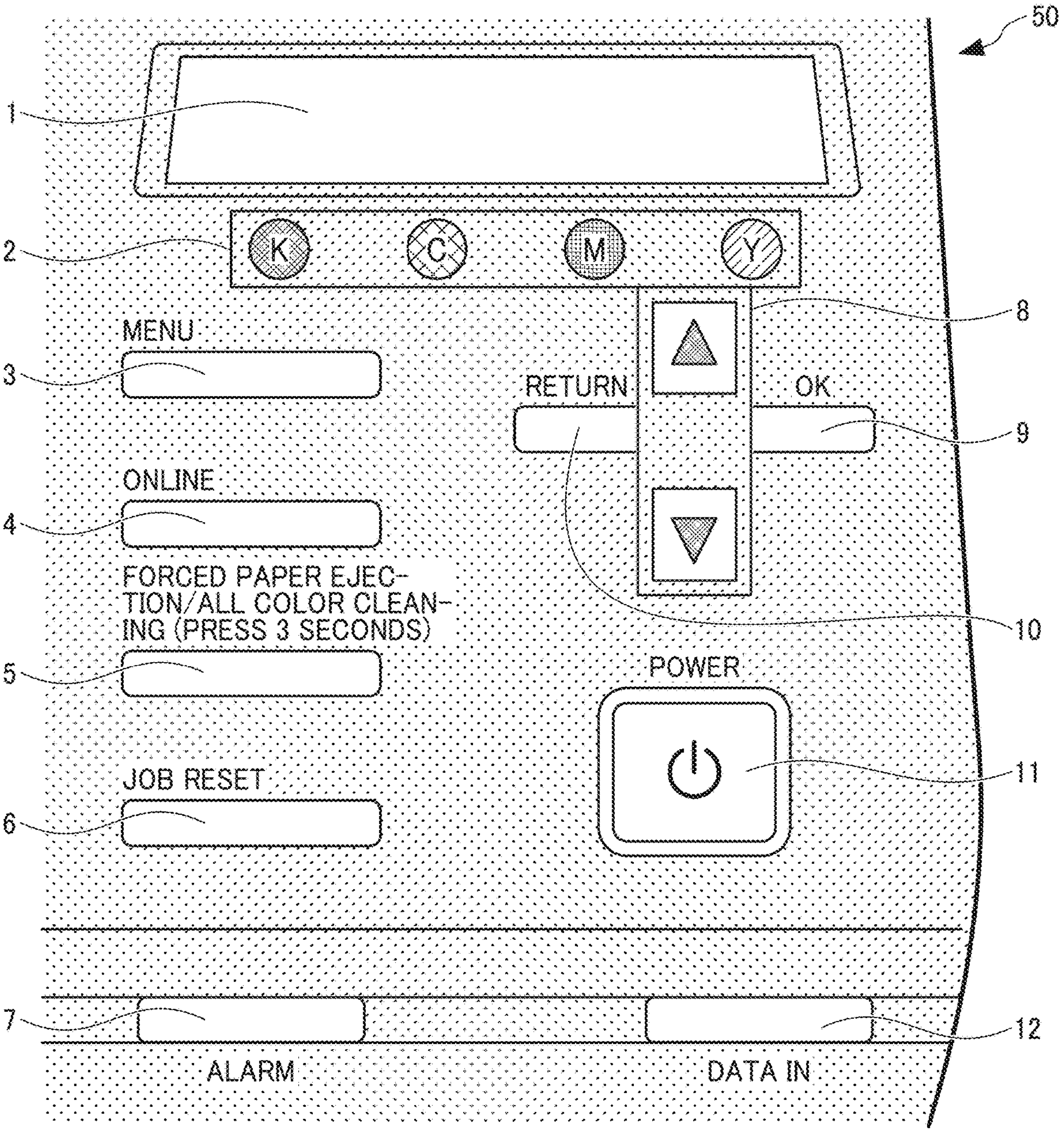
FIG. 5 is a diagram illustrating a control panel according to an embodiment of the present disclosure.

FIG. 5 is a diagram illustrating a control panel 50 according to the present embodiment.

For example, the image forming apparatus 20 includes the control panel 50 illustrated in FIG. 5.

A display 1 is an output unit that displays, for example, a state of the own device or an error message.

An ink color indicator ("ink color") 2 is an output unit that displays the colors of ink and the level (or remaining amount) of each ink.

A menu key 3 is an input unit that allows, for example, a user to input a setting operation.

An online key 4 is an input unit that receives an operation for switching between online and offline of an external device that communicates with the image forming apparatus 20.

A forced-paper-ejection/full-color-cleaning key 5 is an input unit that receives an operation for removing the platen 23 or a head-cleaning operation.

A job-reset key 6 is an input unit that receives an operation for canceling data being printed or received.

An alarm lamp 7 is an output unit that lights up when an error occurs.

An up/down key 8 is an input unit that receives an operation for scrolling on the display 1 or moving up and down the platen 23.

An OK key 9 is an input unit that receives an operation for confirming settings, assigned values, or a hierarchical movement.

A return key 10 is an input unit that receives an operation for returning to a previous level of hierarchy without enabling the settings or returning to the normal display from the menu.

A power key 11 is an input unit that receives an operation for turning on or off the power of the image forming apparatus 20.

A data-in lamp 12 is an output unit that provides information indicating the reception of data from an external device.

For example, a user may operate the up/down key 8 to manually operate the platen 23.

Figure 6:
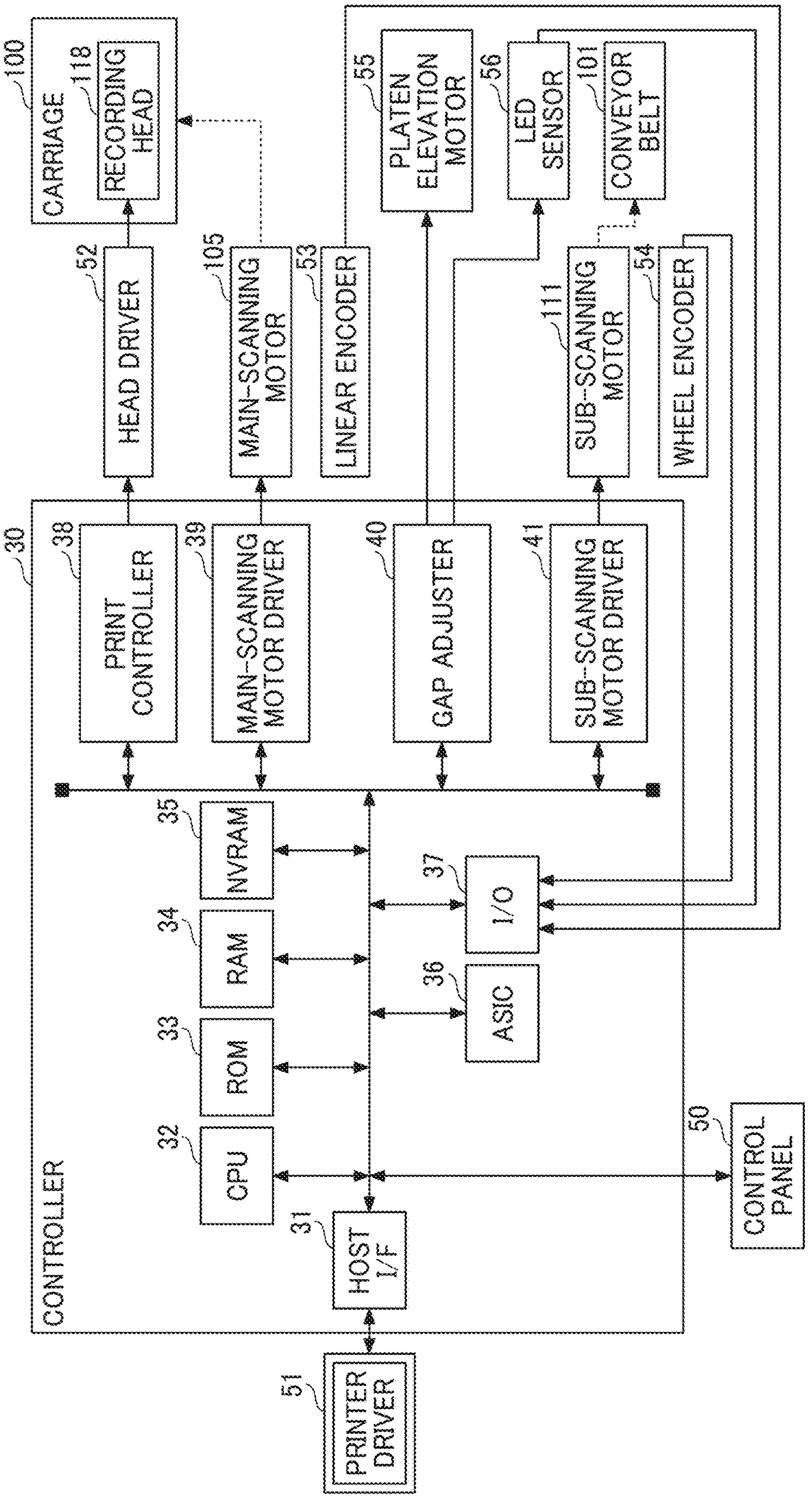
FIG. 6 is a diagram illustrating a configuration of a controller according to an embodiment of the present disclosure.

FIG. 6 is a diagram illustrating a configuration of a controller 30 according to the present embodiment.

The controller 30 includes a host interface (I/F) 31, a central processing unit (CPU) 32, a read only memory (ROM) 33, a random access memory (RAM) 34, a non-volatile random access memory (NVRAM) 35, and an application-specific integrated circuit (ASIC) 36.

The host OF 31 serves as an input and output device to transmit and receive data to and from, for example, a printer driver 51 as an external device. The host OF 31 also receives data such as image data from an external device via a cable or a network.

The CPU 32 serves as a controller and an arithmetic device to control the entire image forming apparatus 20 and perform calculation for performing processes.

The ROM 33 serves as a storage device to store programs and data that the CPU 32 executes.

The RAM 34 serves as a storage device to temporarily store, for example, image data.

The NVRAM 35 serves as a non-volatile storage device to keep storing data even when the power is turned off.

The ASIC 36 serves as a signal processor, a controller to control the entire device, and an arithmetic device.

The controller 30 further includes an input and output device (I/O) 37, a print controller 38, a main-scanning motor driver 39, a gap adjuster 40, and a sub-scanning motor driver 41.

The I/O 37 receives results of detection performed by sensors such as a linear encoder 53, an LED sensor 56, and a wheel encoder 54.

The print controller 38 generates a driving waveform that drives the recording head 118 and outputs data that drives the recording head 118 to a head driver 52. Under control of the head driver 52, the recording head 118 discharges ink.

The head driver 52 receives image data, which may be also referred to as dot pattern data. The image data is in a serial format, which corresponds to one line of the recording head 118.

The print controller 38 includes an amplifier and a digital-to-analog (D/A) converter that performs D/A conversion on a driving pulse.

The main-scanning motor driver 39 drives the main-scanning motor 105.

The gap adjuster 40 controls a platen elevation motor 55. The LED 21 and the light receiving device 22 are disposed horizontally to the platen 23 to detect the height of the platen 23.

Further, the LED 21 and the light receiving device 22 are at the same height as the recording head 118.

The platen elevation motor 55 moves the platen 23 in the Z-axis direction. Then, the LED 21 and the light receiving device 22 detect the position of the platen 23 in the Z-axis direction. In other words, the LED 21 and the light receiving device 22 detect the position of the recording medium 108 when the recording medium 108 is placed on the platen 23. Based on the detection results, the platen elevation motor 55 adjusts the position of the platen 23 in the Z-axis direction. In the following description, the LED 21 and the light receiving device 22 may be collectively referred to as the "LED sensor 56."

In one or more embodiments, a plurality of LED sensors 56 may be disposed.

The controller 30 determines the amount of steps (the number of moving pulses) of the platen elevation motor 55 in the Z-axis direction, based on the rotation direction of the platen elevation motor 55 and the driving frequency of the platen elevation motor 55.

The sub-scanning motor driver 41 drives the sub-scanning motor 111. The sub-scanning motor 111 thus driven moves the conveyor belt 101.

The controller 30 receives a result of operation input through the control panel 50 by, for example, a user.

The CPU 32 reads and analyzes the print data received by the host OF 31. Then, the ASIC 36 performs, for example, image processing and data rearrangement processing and transfers the processed data to the print controller 38. Subsequently, the print controller 38 outputs a driving waveform to the head driver 52.

For example, the dot pattern data may be generated based on the font data stored in a ROM.

The head driver 52 includes, for example, a shift register to which serial data is input, a latch circuit that latches a register value of the shift register with a latch signal, a level conversion circuit (level shifter) that changes the level of an output value of the latch circuit, and an analog switch array.

On-off control of the analog switch array applies a driving pulse included in the driving waveform to the recording head 118.

A description is given below of an operation of the image forming apparatus 20 according to the present embodiment.

Figure 7:
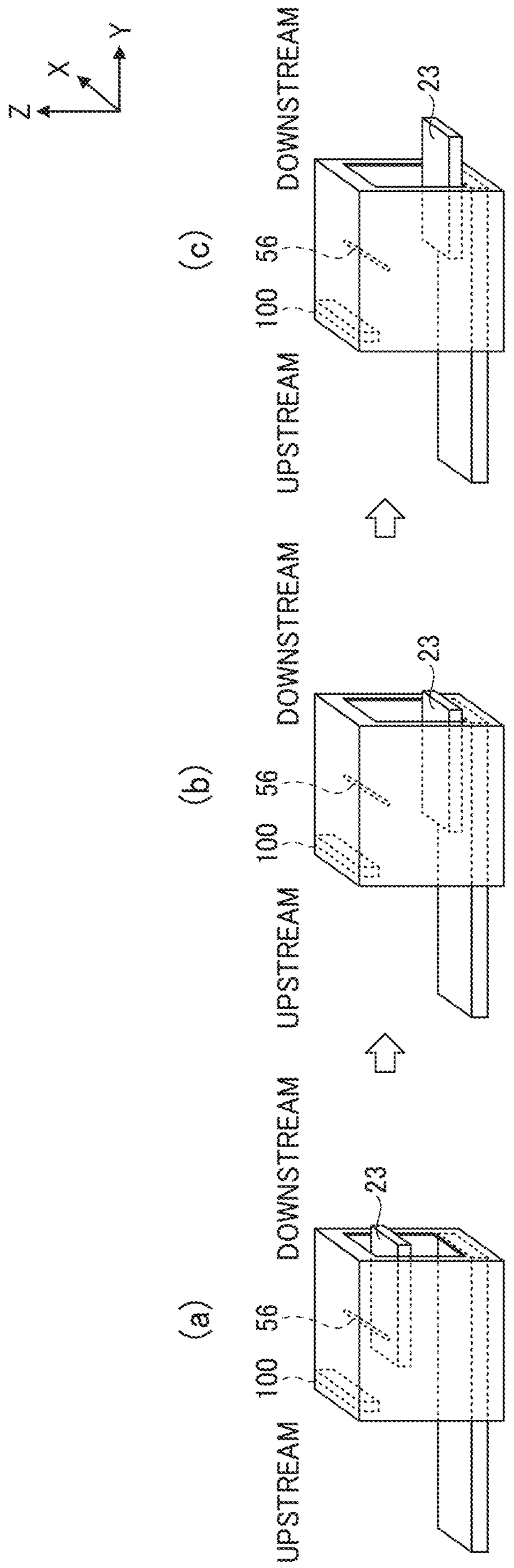
FIG. 7 is a diagram illustrating an operation of an image forming apparatus when the power is turned on, according to an embodiment of the present disclosure.

FIG. 7 is a diagram illustrating an operation of the image forming apparatus 20 when the power is turned on, according to the present embodiment.

When the power is turned on, the image forming apparatus 20 operates in the order of FIGS. 7(*a*), 7(*b*), and 7(*c*).

As illustrated in FIG. 7(*a*), before the power is turned on, in other words, when the power is off, the platen 23 is at a downstream position in the Y-axis direction (conveyance direction).

In FIG. 7, the carriage 100 indicates a scanning range in which the recording head 118 moves.

When the power is turned on, the platen 23 moves, from the position on the conveyor belt 101, to a height (a position in the Z-axis direction) to be detected by the LED sensor 56 as illustrated in FIG. 7(*a*).

FIG. 7(*b*) illustrates the platen 23 lowered after being moved as illustrated in FIG. 7(*a*).

FIG. 7(*c*) illustrates the platen 23 moved, with the movement of the conveyor belt 101, to a position where the recording medium 108 is placed on the platen 23, after being lowered as illustrated in FIG. 7(*b*). The user places the recording medium 108 on the platen 23 in the state illustrated in FIG. 7(*c*).

Figure 8:
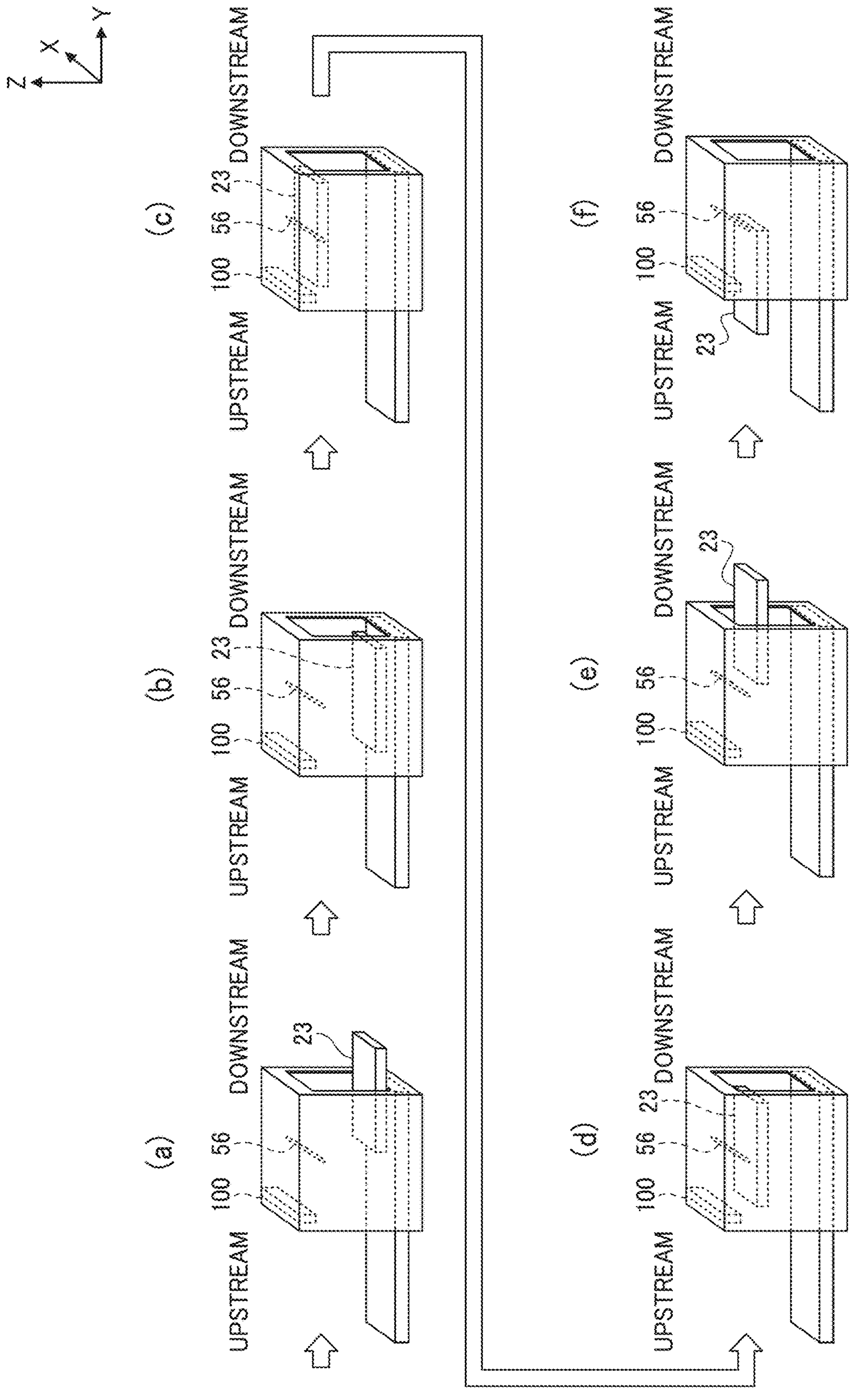
FIG. 8 is a diagram illustrating an operation of the image forming apparatus of FIG. 7 when the image forming apparatus starts image formation.

FIG. 8 is a diagram illustrating an operation of the image forming apparatus 20 when the image forming apparatus 20 starts image formation, according to the present embodiment.

For example, when the user gives an instruction to start image formation, the image forming apparatus 20 operates in the order of FIGS. 8(*a*), 8(*b*), 8(*c*), 8(*d*), 8(*e*), and 8(*f*).

FIG. 8(*a*) illustrates the platen 23 at an initial position when the instruction to start image formation is given. When the user places the recording medium 108 on the platen 23, the image forming apparatus 20 starts image formation.

FIG. 8(*b*) illustrates the platen 23 moved to a position directly below the LED sensor 56 by the control of the sub-scanning motor 111.

FIG. 8(*c*) illustrates the platen 23 moved to a position where the platen 23 is detected by the LED sensor 56.

FIG. 8(*d*) illustrates the platen 23 lowered by a predetermined distance from the position illustrated in FIG. 8(*c*), specifically, the position at which the recording medium 108 is detected by the LED sensor 56.

FIG. 8(*e*) illustrates the platen 23 moved downstream in the Y-axis direction (conveyance direction) from the position illustrated in FIG. 8(*d*) by the control of the sub-scanning motor 111.

FIG. 8(*f*) illustrates the platen 23 moved to a position where image formation is performed from the position illustrated in FIG. 8(*e*) by the control of the sub-scanning motor 111 and also illustrates the LED sensor 56 ready for detection of a collision.

When no collision is detected, the image forming apparatus 20 performs image formation. By contrast, when the collision is detected, the image forming apparatus 20 stops the image formation.

Figure 9:
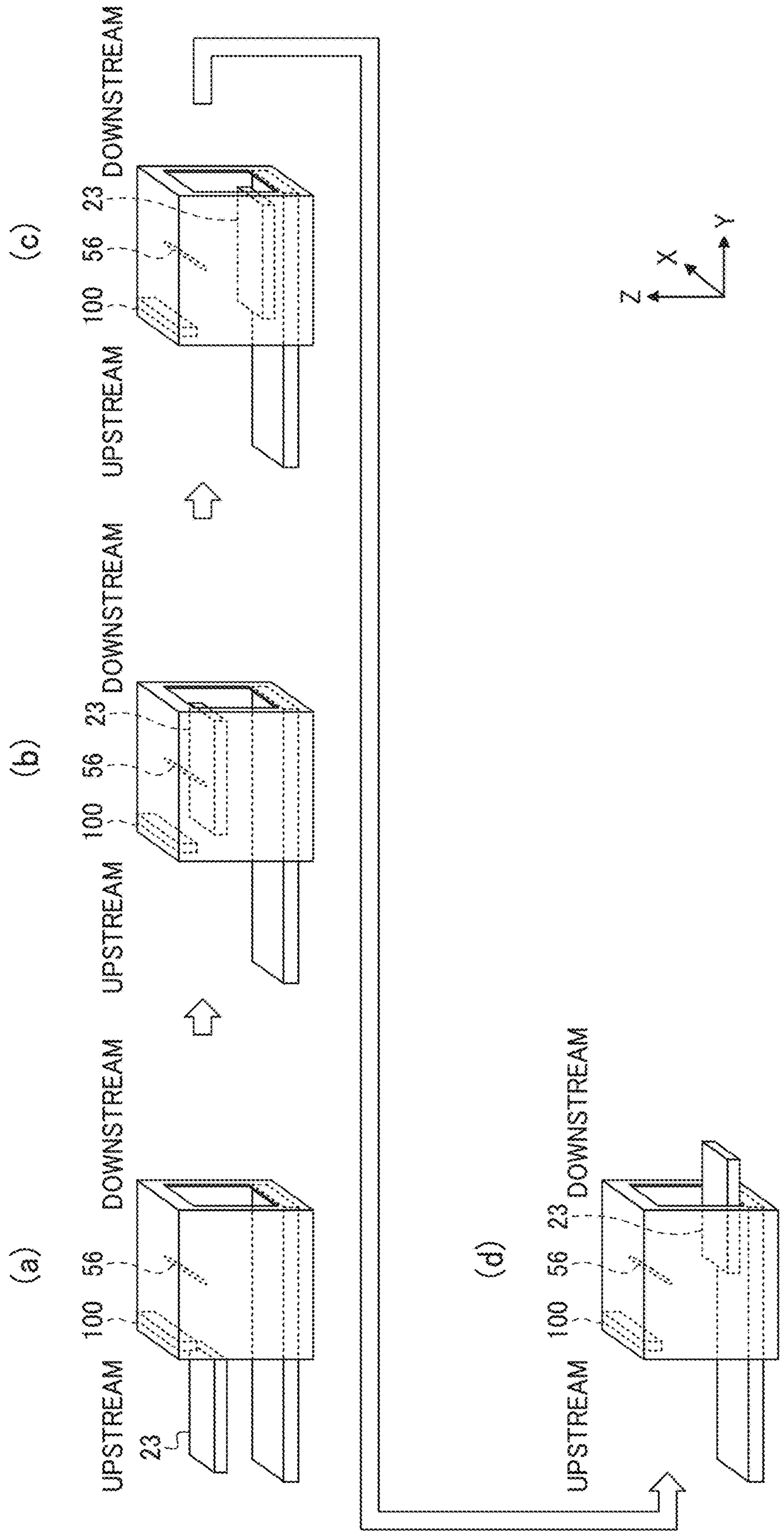
FIG. 9 is a diagram illustrating an operation of the image forming apparatus of FIG. 7 when no collision is detected.

FIG. 9 is a diagram illustrating an operation of the image forming apparatus 20 when no collision is detected, according to the present embodiment.

When no collision is detected in FIG. 8(*f*), the image forming apparatus 20 operates in the order of FIGS. 9(*a*), 9(*b*), 9(*c*), and 9(*d*). By contrast, when the collision is detected in FIG. 8(*f*), the image forming apparatus 20 stops the image formation and does not perform the operation illustrated in FIG. 9.

FIG. 9(*a*) illustrates the platen 23 when the image formation is started.

FIG. 9(*b*) illustrates the recording head 118 discharging ink to form an image on the recording medium 108 on the platen 23 moving downstream in the Y-axis direction (conveyance direction). When the platen 23 is moved by a predetermined distance from the initial position illustrated in FIG. 9(*a*), the image formation is completed.

FIG. 9(*c*) illustrates the platen 23 lowered in the Z-axis direction after the image formation is completed.

FIG. 9(*d*) illustrates the platen 23 moved, by the control of the sub-scanning motor 111 after the platen 23 is lowered in the Z-axis direction, to the position where the recording medium 108 is placed on the platen 23.

After "moving the platen 23 to the position directly below the LED sensor 56" in FIG. 8(*b*), the position of the platen 23 in the Z-axis direction is determined by the movement illustrated in FIGS. 8(*c*) to 8(*f*). In this determination, if the position of the platen 23 in the Z-axis direction is not adjusted, a collision is detected unless, for example, the position or posture of the recording medium 108 changes.

To prevent such a situation, the image forming apparatus 20 adjusts the distance between the recording medium 108 and the recording head 118.

A description is given below of some examples of the adjustment.

Specifically, a description is given below of the adjustment in a case where four examples of the recording medium 108 and the platen 23 are used.

Figure 10B:
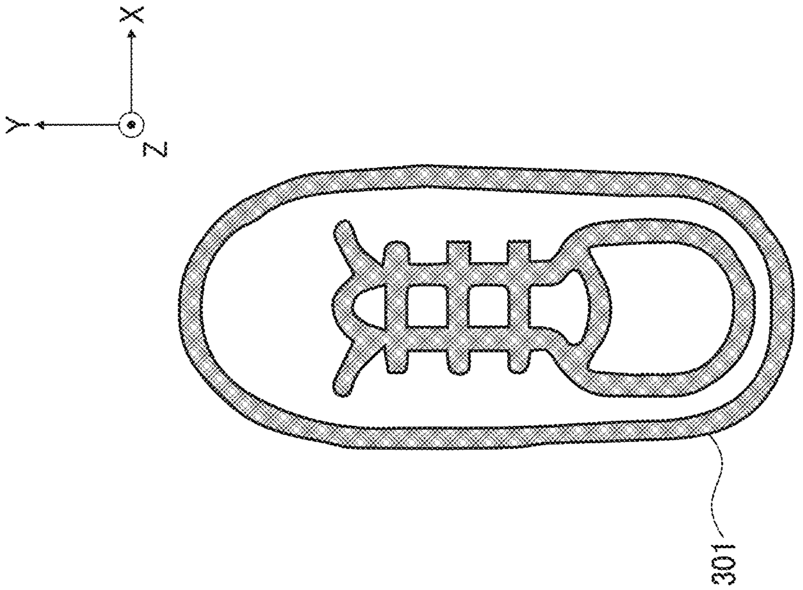
FIG. 10B is a diagram illustrating a recording medium according to the first example.
Figure 10A:
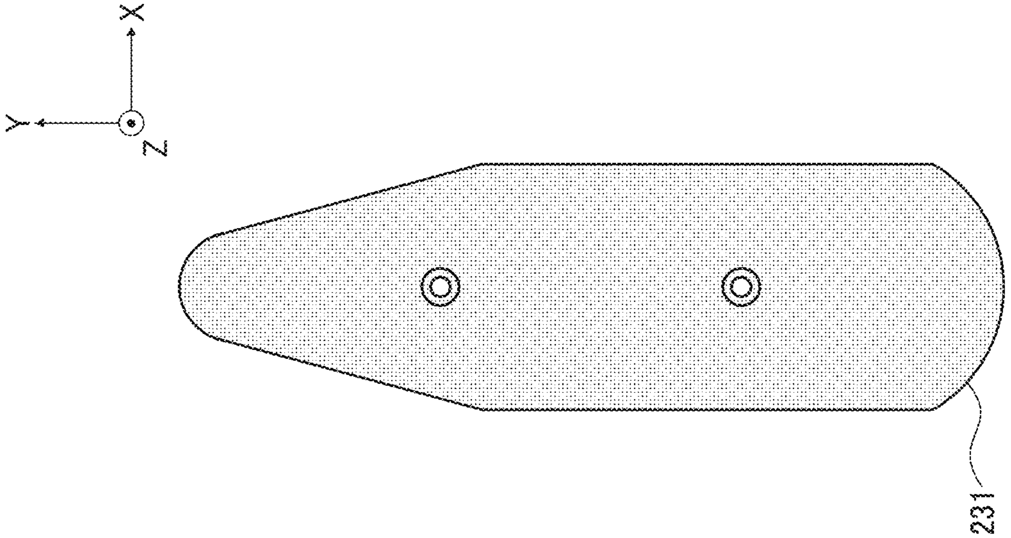
FIG. 10A is a diagram illustrating a platen according to a first example.

FIG. 10A is a diagram illustrating a platen according to a first example. FIG. 10B is a diagram illustrating a recording medium according to the first example.

For example, a first platen 231 having a shape illustrated in FIG. 10A may be used. The first platen 231 is used for a shoe 301 illustrated in FIG. 10B as a recording medium.

Figure 11B:
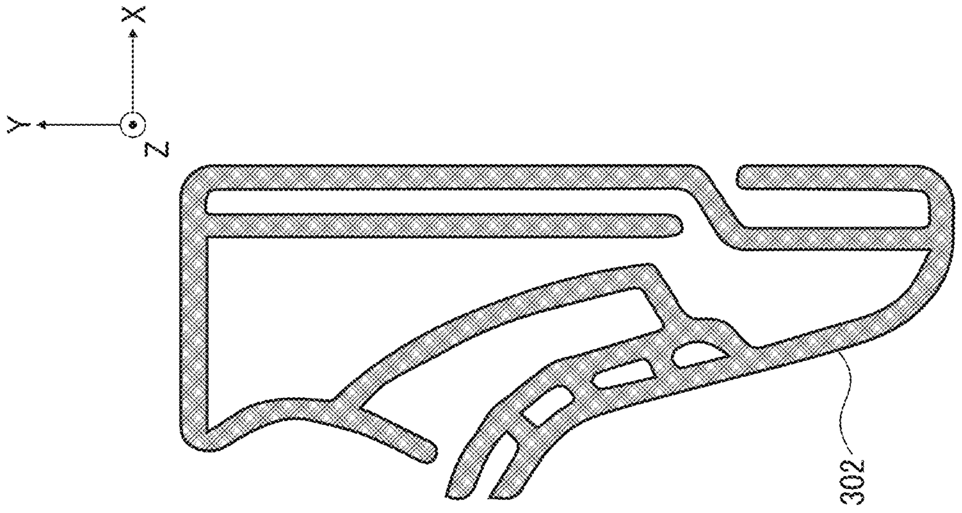
FIG. 11B is a diagram illustrating a recording medium according to the second example.
Figure 11A:
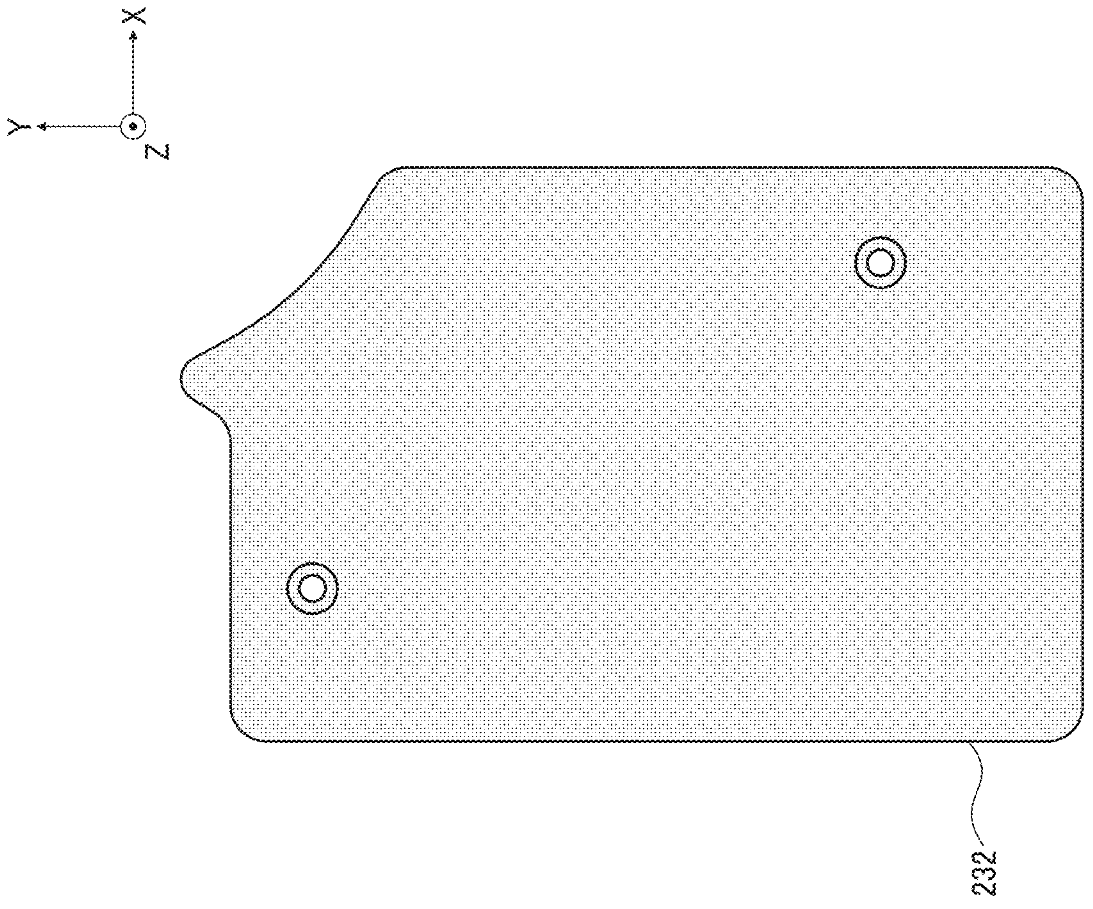
FIG. 11A is a diagram illustrating a platen according to a second example.

FIG. 11A is a diagram illustrating a platen according to a second example. FIG. 11B is a diagram illustrating a recording medium according to the second example.

For example, a second platen 232 having a shape illustrated in FIG. 11A may be used. The second platen 232 is used for a shoe 302 illustrated in FIG. 11B as a recording medium. The first shoe 301 in the first example is in a "front" orientation, whereas the second shoe 302 in the second example is in a "side" orientation.

Figure 12B:
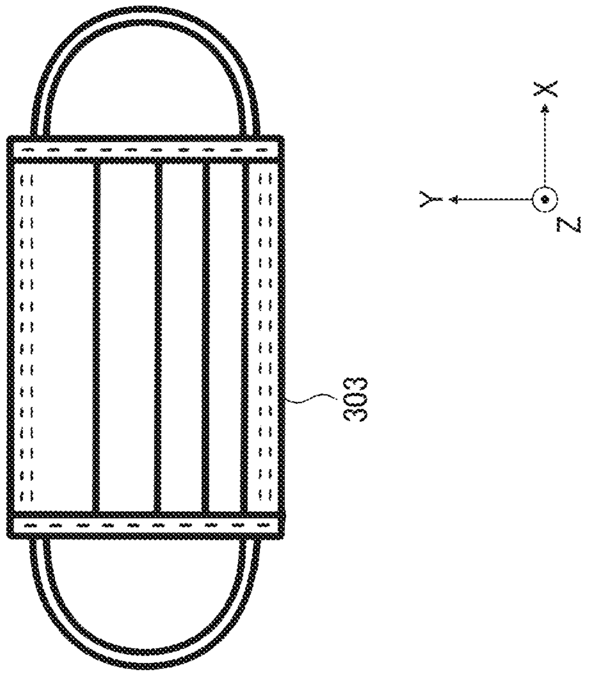
FIG. 12B is a diagram illustrating a recording medium according to the third example.
Figure 12A:
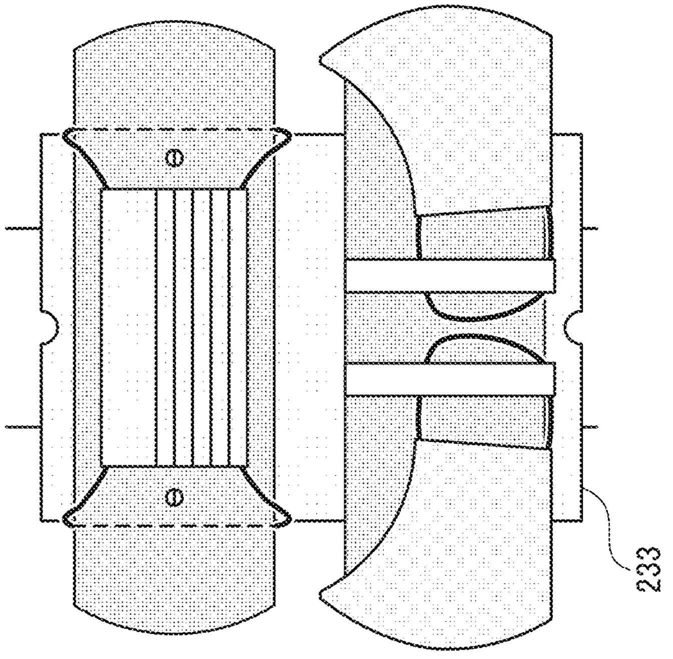
FIG. 12A is a diagram illustrating a platen according to a third example.

FIG. 12A is a diagram illustrating a platen according to a third example. FIG. 12B is a diagram illustrating a recording medium according to the third example.

For example, a third platen 233 having a shape illustrated in FIG. 12A may be used. The third platen 233 is used for a mask 303 illustrated in FIG. 12B as a recording medium.

Figure 13B:
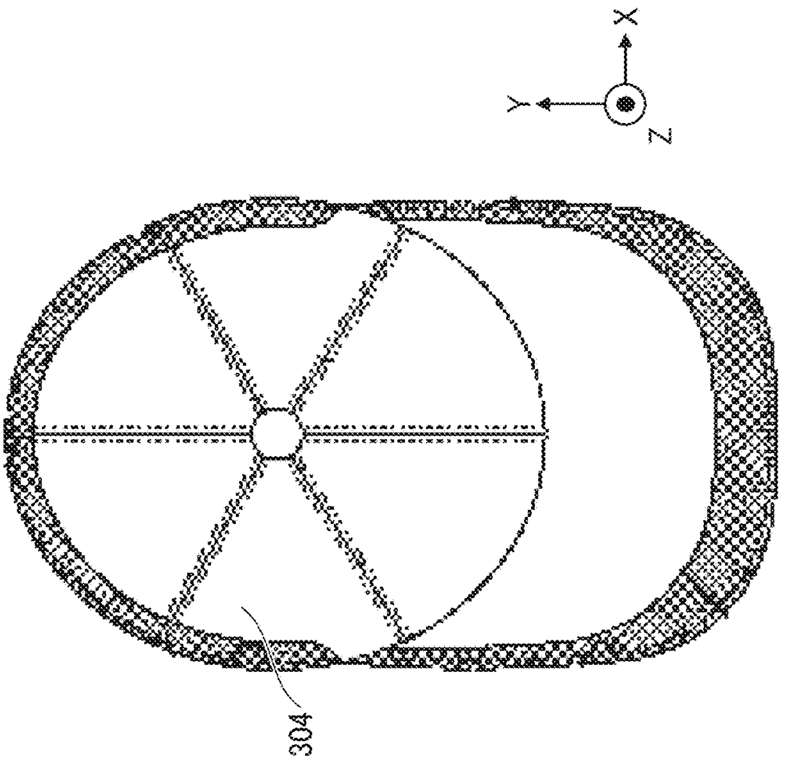
FIG. 13B is a diagram illustrating a recording medium according to the fourth example.
Figure 13A:
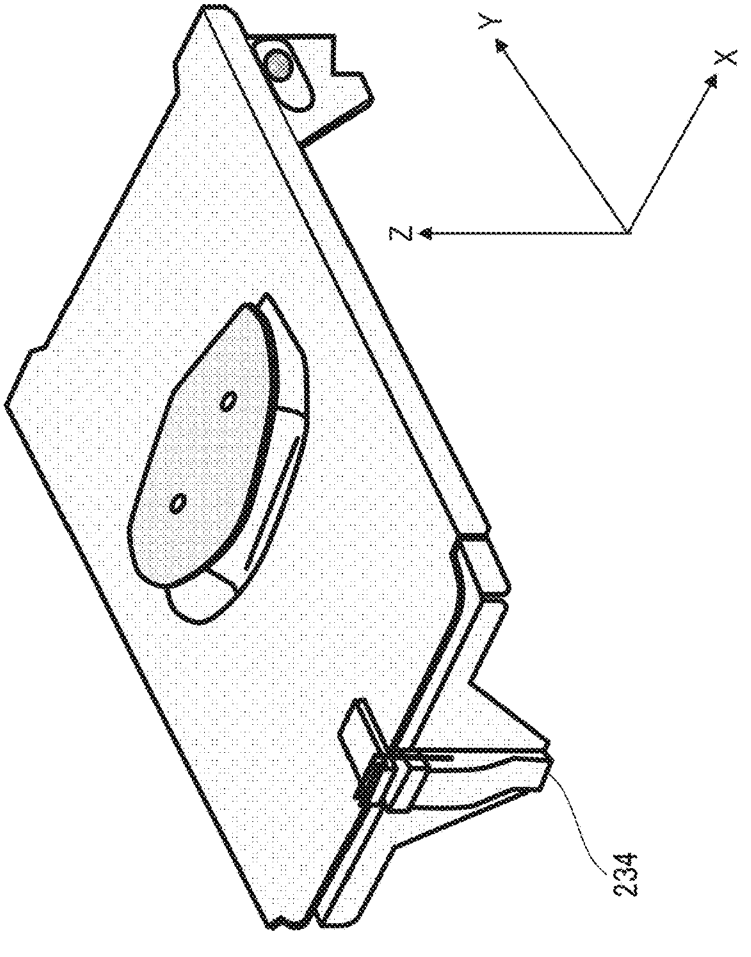
FIG. 13A is a diagram illustrating a platen according to a fourth example.

FIG. 13A is a diagram illustrating a platen according to a fourth example. FIG. 13B is a diagram illustrating a recording medium according to the fourth example.

For example, a fourth platen 234 having a shape illustrated in FIG. 13A may be used. The fourth platen 234 is used for a hat 304 illustrated in FIG. 13B as a recording medium.

The type of platen and the type of recording medium are not limited to the aforementioned types. For example, the recording medium may be clothing such as a T-shirt.

The use of the platen 23 according to the shape of the recording medium as described above allows various types of recording media to be placed in the image forming apparatus 20.

A description is given below of some examples of setting a detection range.

The detection range, which is a range for detecting a collision, is set as below for the four examples of the recording medium 108 and the platen 23 described above.

Figure 14:
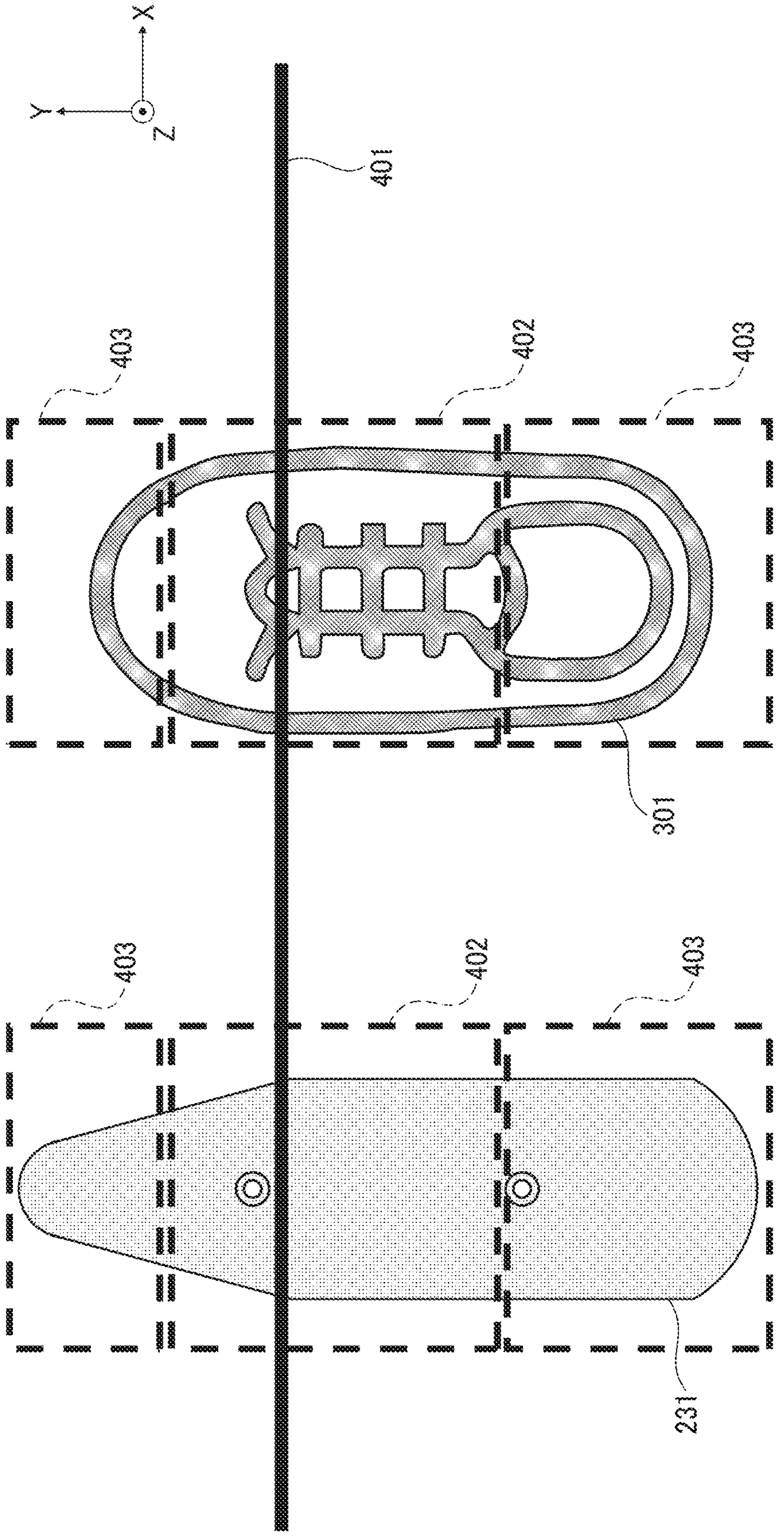
FIG. 14 is a diagram illustrating the setting of a first detection range that corresponds to the first example.

FIG. 14 is a diagram illustrating the setting of a first detection range 402 that corresponds to the first example.

In the following description, the position at which the LED sensor 56 detects a collision may be referred to as a "sensor position 401." The image forming apparatus 20 detects a collision in the detection range centered on the sensor position 401. On the other hand, a range other than the detection range is a range in which the LED sensor 56 does not detect a collision. Such a range other than the detection range may be referred to as an "invalid range 403."

For the first platen 231 illustrated in FIG. 10A and the shoe 301 illustrated in FIG. 10B, the first detection range 402 is set.

Figure 15:
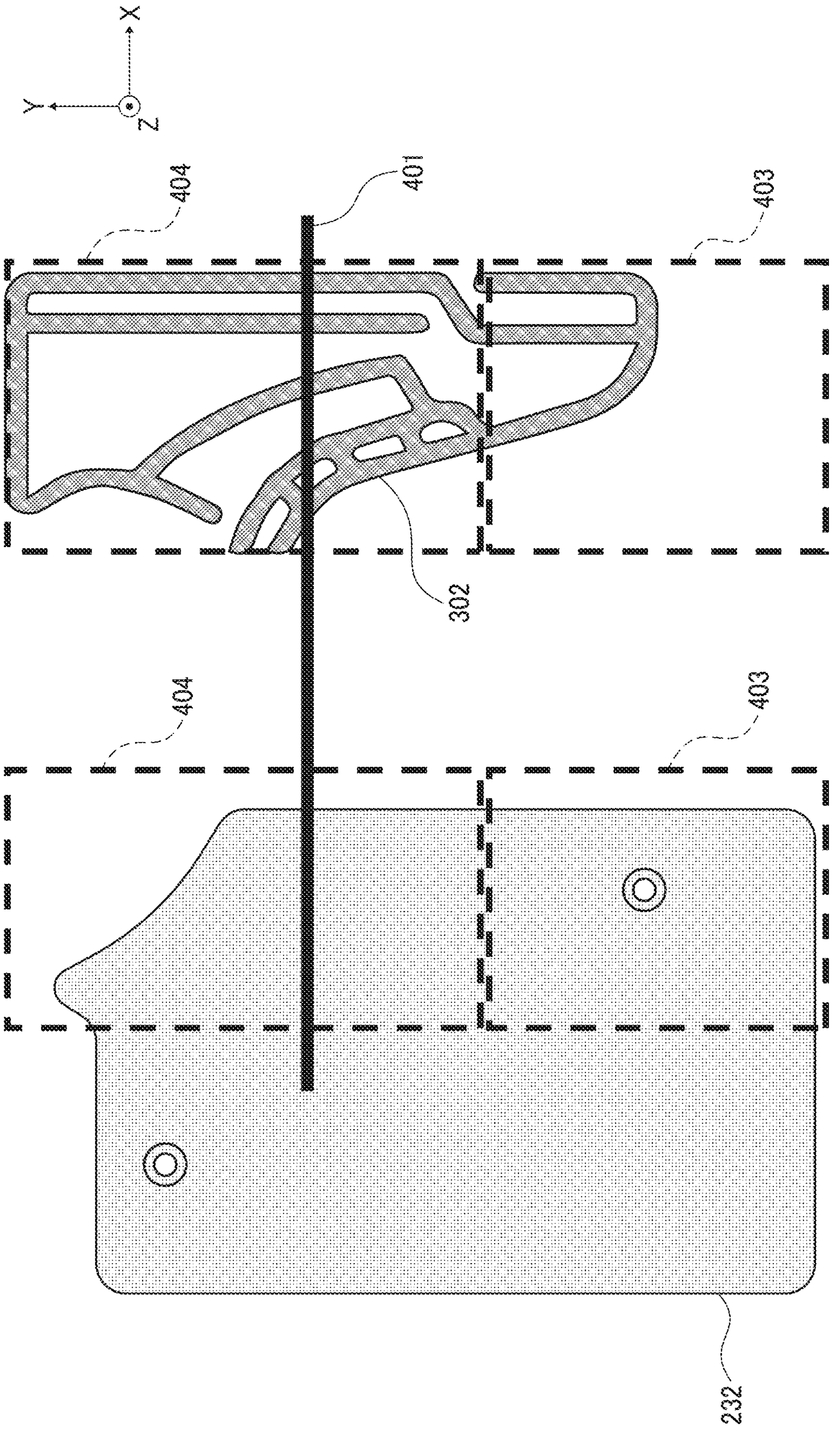
FIG. 15 is a diagram illustrating the setting of a second detection range that corresponds to the second example.

FIG. 15 is a diagram illustrating the setting of a second detection range 404 that corresponds to the second example.

For the second platen 232 illustrated in FIG. 11A and the shoe 302 illustrated in FIG. 11B, the second detection range 404 is set.

Figure 16:
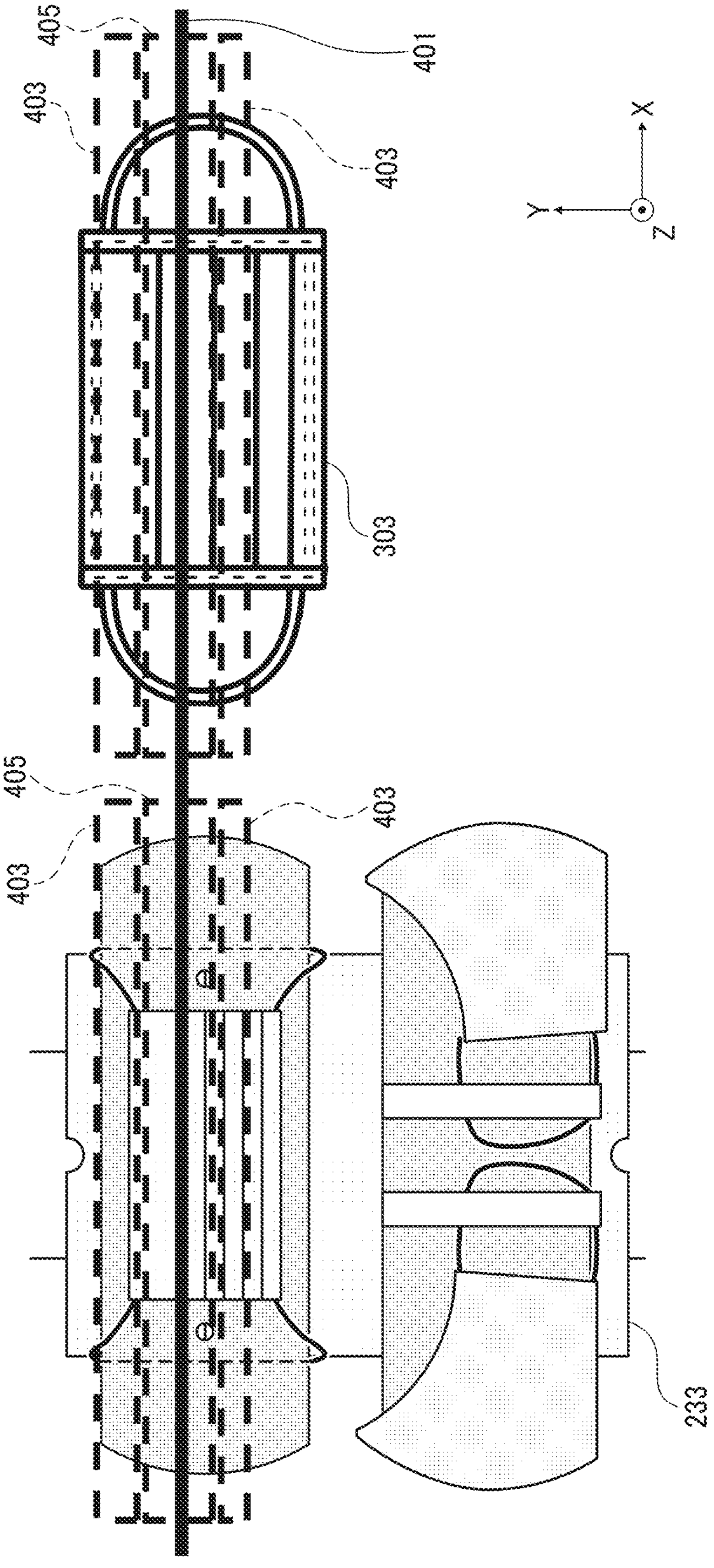
FIG. 16 is a diagram illustrating the setting of a third detection range that corresponds to the third example.

FIG. 16 is a diagram illustrating the setting of a third detection range 405 that corresponds to the third example.

For the third platen 233 illustrated in FIG. 12A and the mask 303 illustrated in FIG. 12B, the third detection range 405 is set.

Figure 17:
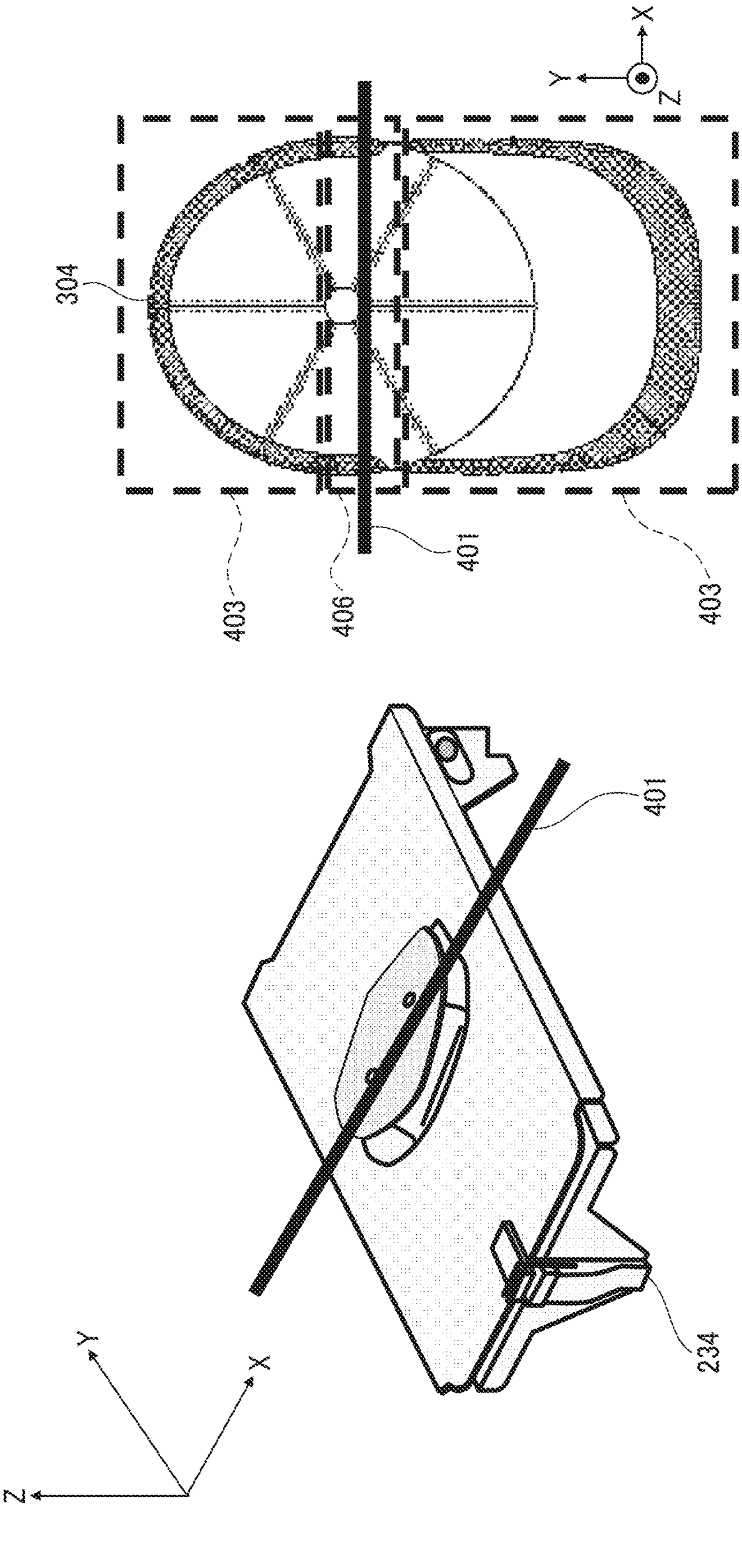
FIG. 17 is a diagram illustrating the setting of a fourth detection range that corresponds to the fourth example.

FIG. 17 is a diagram illustrating the setting of a fourth detection range 406 that corresponds to the fourth example.

For the fourth platen 234 illustrated in FIG. 13A and the hat 304 illustrated in FIG. 13B, the fourth detection range 406 is set.

As illustrated in FIGS. 14 to 17, the detection range is preferably set according to the type of platen and the type of recording medium. For example, an integrated circuit (IC) chip may be set on the platen in advance. In this case, the type of platen is identified based on the IC chip. The type of platen may be identified by a sensor such as a switch. Thus, the image forming apparatus 20 sets the detection range according to the identified type of platen.

The correspondence between the type of platen and the detection range is input as data in advance. For example, table data associating the type of platen with the detection range is input in advance. Thus, when identifying the type of platen, the image forming apparatus 20 refers to the table data and sets the detection range.

The detection range is set around a range with a high possibility of collision. For example, the sensor position 401 illustrated in FIGS. 14 to 17 is set to face the highest portion of each recording medium in the Z-axis direction. The collision is likely to occur at the highest portion of the recording medium. For this reason, the detection range is preferably set to target the highest portion of the recording medium. The detection range thus set prevents the collision and accelerates the detection processing as the detection range is narrowed.

A description is given below of an overall process performed by the image forming apparatus 20 according to the present embodiment.

Figure 18:
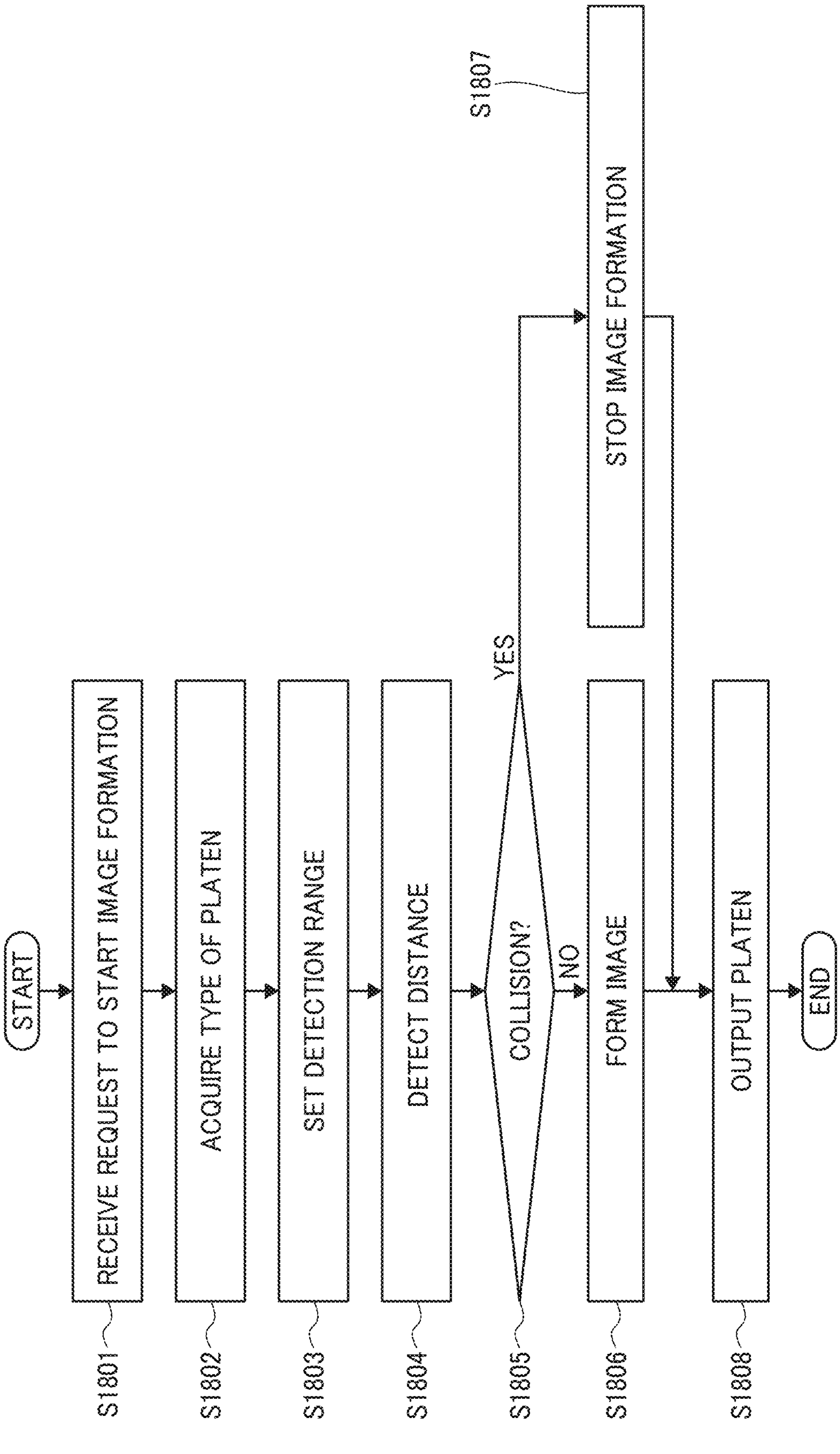
FIG. 18 is a flowchart of an overall process according to an embodiment of the present disclosure.

FIG. 18 is a flowchart of the overall process according to the present embodiment.

In step S1801, the controller 30 of the image forming apparatus 20 receives a request to start image formation. For example, the request is issued from an application for printing and received by the image forming apparatus 20.

In step S1802, the controller 30 of the image forming apparatus 20 acquires the type of platen. For example, the image forming apparatus 20 acquires data of, for example, an IC chip, identifies the data, and acquires the type of platen.

In step S1803, the controller 30 of the image forming apparatus 20 sets the detection range based on the type of platen and the type of recording medium.

In step S1804, the LED sensor 56 of the image forming apparatus 20 detects a distance between the recording medium and the recording head.

In step S1805, the controller 30 of the image forming apparatus 20 determines whether a collision between the recording medium and the recording head occurs based on a sensor output. When determining that a collision occurs (YES in step S1805), the image forming apparatus 20 proceeds to step S1807. By contrast, when determining that no collision occurs (NO in step S1805), the image forming apparatus 20 proceeds to step S1806.

In step S1806, the controller 30 of the image forming apparatus 20 forms an image.

In step S1807, the controller 30 of the image forming apparatus 20 stops the image formation.

In step S1808, the controller 30 of the image forming apparatus 20 outputs the platen after the image formation is completed.

When completing the image formation in step S1806, the image forming apparatus notifies a user that the image formation is successful. On the other hand, when stopping the image formation in step S1807, the image forming apparatus 20 notifies the user that the image formation is canceled.

The user may adjust the height of the platen 23 when ascertaining that the image formation is canceled.

A description is given below of a case where the height of the platen 23 is adjusted.

In FIG. 18, when the image forming apparatus 20 determines that a collision occurs (YES in step S1805), the image forming apparatus 20 preferably adjusts the distance between the recording head and the recording medium. Specifically, the image forming apparatus 20 lowers the platen in the Z-axis direction to a height at which the collision can be prevented. In the adjustment, it is set in advance how much the platen is lowered at a time. After the adjustment, the image forming apparatus 20 determines whether a collision occurs. In other words, after the adjustment, the image forming apparatus 20 executes the operation in step S1805 again.

When determining that no collision occurs (NO in step S1805), the image forming apparatus 20 proceeds to step S1806. By contrast, when determining again that a collision occurs (YES in step S1805), the image forming apparatus 20 adjusts the distance between the recording head and the recording medium again.

Such an adjustment to prevent the collision based on the detection result allows the user to reduce the time and effort for the setting.

A description is given below of a functional configuration of the image forming apparatus 20 according to the present embodiment.

Figure 19:
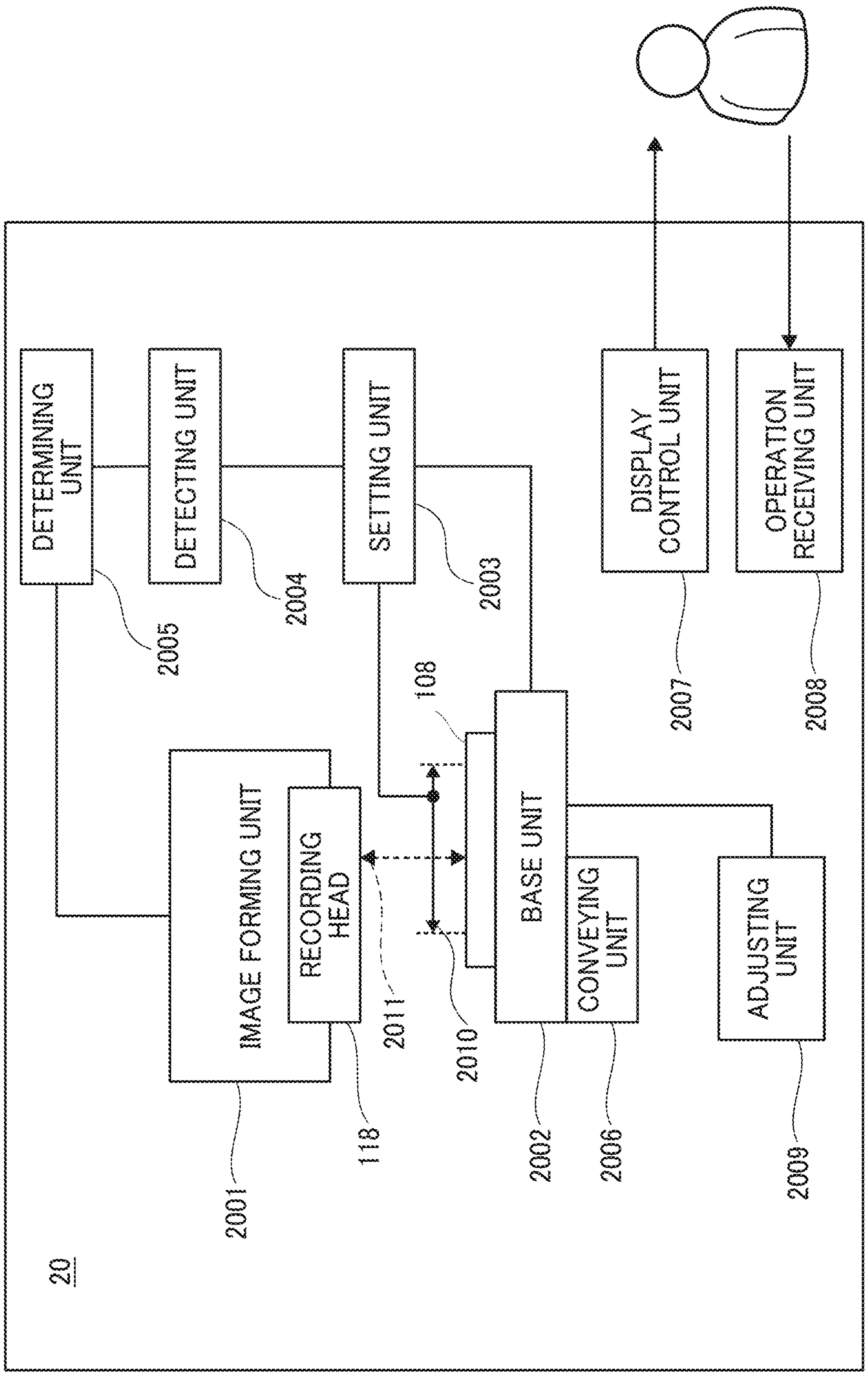
FIG. 19 is a diagram illustrating a functional configuration according to an embodiment of the present disclosure.

FIG. 19 is a diagram illustrating the functional configuration of the image forming apparatus 20 according to the present embodiment.

The image forming apparatus 20 includes an image forming unit 2001, a base unit 2002, a setting unit 2003, and a detecting unit 2004. Preferably, the image forming apparatus further includes a determining unit 2005, a conveying unit 2006, a display control unit 2007, and an operation receiving unit 2008, and an adjusting unit 2009.

The image forming unit 2001 performs an image forming procedure for forming an image on the recording medium 108 with the recording head 118. For example, the image forming unit 2001 is implemented by the carriage 100 serving as an image forming device.

The base unit 2002 is of a different type depending on the type of the recording medium 108. For example, the base unit 2002 is implemented by the platen 23 serving as a base.

The setting unit 2003 performs a setting procedure for setting a detection range 2010. For example, the setting unit 2003 is implemented by the CPU 32.

The detecting unit 2004 performs a detection procedure for detecting, before the image forming unit 2001 forms an image, a collision between the recording medium 108 and the recording head 118. For example, the detecting unit 2004 is implemented by the LED sensor 56 serving as a detector. Specifically, when the light receiving device 22 no longer receives the light emitted by the LED 21, the detecting unit 2004 outputs a detection result indicating that the recording medium 108 and the recording head 118 collide with each other.

The determining unit 2005 performs a determination procedure for determining, based on the result of detection performed by the detecting unit 2004, whether to cause the image forming unit 2001 to form an image. For example, the determining unit 2005 is implemented by the CPU 32.

The conveying unit 2006 performs a conveyance procedure for conveying the recording medium 108. For example, the conveying unit 2006 is implemented by the controller 30 and the conveyor belt 101 serving as a conveyor.

The display control unit 2007 outputs various kinds of information to an output device such as the display 1. For example, the display control unit 2007 outputs the amount of elevation of the platen 23, a gap value, and various kinds of messages. For example, the display control unit 2007 is implemented by the CPU 32.

The operation receiving unit 2008 receives a user operation on the control panel 50.

The adjusting unit 2009 performs an adjustment procedure for adjusting, based on the detection result, a distance 2011 to prevent a collision between the recording medium 108 and the recording head 118.

Specifically, the adjusting unit 2009 drives and rotates the platen elevation motor 55 to move the platen 23 up and down. The adjusting unit 2009 adjusts the distance 2011 by changing the height of the platen 23 or moving the platen 23 as described above.

For example, the adjusting unit 2009 is implemented by the gap adjuster 40.

The image forming apparatus 20 is coupled to the platen 23 dedicated for the type of the recording medium 108 (for example, the types illustrated in FIGS. 10A to 13B). The type of the platen 23 is identified by identification information set to the platen 23 in advance by an IC chip or a result of sensing performed by a physical switch depending on the type of the platen 23.

When the type of the recording medium 108 is determined, the base unit 2002 is determined. The optimum detection range varies depending on the type of the base unit 2002. For this reason, the detection range is preferably set to an optimum detection range according to, for example, the type of the base unit 2002. With such an optimum detection range, the image forming apparatus 20 omits the processing of detecting a range in which a collision may not occur, to shorten the preparation time for image formation.

The detection range 2010 set according to the type of the base unit 2002 is an optimum detection range for the type of the recording medium 108. Since the detection range 2010 and the invalid range 403 are optimally set for the type of the recording medium 108, the preparation time for performing image formation is shortened.

The determining unit 2005 allows the image forming apparatus 20 to determine whether to perform image formation or cancel image formation based on the detection result. Such a configuration allows the image forming apparatus 20 to shorten the preparation time for performing image formation or a time until the image forming apparatus 20 cancels image formation.

The display control unit 2007 allows a user to ascertain a result of determination by the determining unit 2005. Such a configuration allows the user to quickly know the determination as to whether to perform image formation or cancel image formation.

A description is given below of the base.

The platen 23 is a support that supports an object serving as a recording medium in image formation in the inkjet printing system. The shape and material of the platen 23 may vary depending on the type of the recording medium 108. The type of the platen 23 most suitable for each type of the recording medium 108 is determined in advance. Accordingly, when the type of the target recording medium 108 is determined, an optimum type of the platen 23 is selected from a plurality of types of the platens 23 prepared in advance.

A description is given below of the recording medium.

Examples of the recording medium 108 include, but are not limited to, a sheet of plain paper, a sheet of coated paper, a sheet of label paper, an overhead projector sheet, a film, and a flexible thin plate. In other words, the recording medium 108 is made of, for example, a material to which ink droplets can at least temporarily adhere, a material to which ink droplets adhere and are fixed, or a material to which ink droplets adhere and permeate. Specific examples of the recording medium 108 include, but are not limited to, a recording medium such as a sheet, a film, or cloth, an electronic component such as an electronic substrate or a piezoelectric element, which may be referred to as a piezoelectric component, layered powder, an organ model, and a testing cell. In short, the recording medium 108 is made of any material to which liquid can adhere, such as paper, thread, fiber, fabric, leather, metal, plastic, glass, wood, ceramic, or a combination thereof.

A description is given below of some other embodiments of the present disclosure.

The image forming method may be implemented based on, for example, a program. Specifically, devices such as an arithmetic device, a storage device, and a control device operate in cooperation with each other based on a program to execute the image forming method. The program may be stored in a computer-readable storage medium and distributed or may be distributed through an electric communication line.

Each device or apparatus may be constructed of a plurality of devices. Thus, each process or processing may be executed in a distributed, redundant, or parallel manner.

A description is given below of some aspects of the present disclosure.

According to a first aspect, an image forming apparatus includes an image forming unit, a base unit, a setting unit, and a detecting unit. The image forming unit includes a recording head to form an image on a recording medium conveyed in a conveyance direction. The base unit supports the recording medium and is movable in the conveyance direction. The type of the base unit is changeable according to the type of the recording medium. The setting unit sets a detection range in the conveyance direction. The detecting unit detects, before the image is formed, a collision between the recording head and the recording medium on the base unit, in the detection range set by the setting unit.

According to a second aspect, in the image forming apparatus of the first aspect, the setting unit sets the detection range according to the type of the base unit.

According to a third aspect, the image forming apparatus of the first or second aspect, further includes a determining unit to determine, based on a result of detection performed by the detecting unit, whether to cause the image forming unit to form the image.

According to a fourth aspect, the image forming apparatus of the third aspect, further includes a display control unit to output a result of determination performed by the determining unit.

According to a fifth aspect, the image forming apparatus of any one of the first to fourth aspects, further includes an adjusting unit to adjust, based on a result of detection performed by the detecting unit, a distance between the recording medium and the recording head to prevent the collision.

According to a sixth aspect, the image forming apparatus of any one of the first to fifth aspects, further includes a conveying unit to convey the recording medium. In the image forming apparatus of any one of the first to fifth aspects, the conveying unit conveys, in the conveyance direction, the recording medium placed on the base unit. The image forming unit forms the image in an inkjet printing system. The detecting unit detects the collision in the detection range.

According to one aspect of the present disclosure, the preparation time for image formation is shortened.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

an image forming device including a recording head to form an image on a recording medium conveyed in a conveyance direction;

a base to support the recording medium and movable in the conveyance direction, a type of the base being changeable according to a type of the recording medium;

circuitry configured to set a detection range in the conveyance direction; and a detector to detect, before the image is formed, a collision between the recording head and the recording medium on the base, in the detection range set by the circuitry.

2. The image forming apparatus according to claim 1, wherein the circuitry is configured to set the detection range according to the type of the base.

3. The image forming apparatus according to claim 1, wherein the circuitry is configured to determine, based on a result of detection performed by the detector, whether to cause the image forming device to form the image.

4. The image forming apparatus according to claim 3, wherein the circuitry is configured to output a result of determination.

5. The image forming apparatus according to claim 1, further comprising a gap adjuster to adjust, based on a result of detection performed by the detector, a distance between the recording medium and the recording head to prevent the collision.

6. The image forming apparatus according to claim 1, further comprising a conveyor to convey the recording medium, wherein the conveyor conveys, in the conveyance direction, the recording medium placed on the base, wherein the image forming device forms the image in an inkjet printing system, and wherein the detector detects the collision in the detection range.

7. An image forming method, comprising:

setting a detection range in a conveyance direction;

detecting a collision between a recording head and a recording medium on a base in the detection range, the base being configured to support the recording medium and movable in the conveyance direction, a type of the base being changeable according to a type of the recording medium; and forming, with the recording head, an image on the recording medium conveyed in the conveyance direction.

* * * * *